Patented Jan. 30, 1951

2,539,483

UNITED STATES PATENT OFFICE 2,539,483

UREA ASCORBATE AND COMPLEXES CONTAINING THE SAME AND PROCESS FOR THEIR MANUFACTURE

Simon L. Ruskin, New York, N. Y.

No Drawing. Application March 28, 1945,
Serial No. 585,380

3 Claims. (Cl. 260—344.5)

The present invention relates to new and improved therapeutic preparations consisting of or containing urea ascorbate either alone or in combination or association with various physiologically active substances, and to a process for manufacturing the same.

More specifically, the invention relates to therapeutic preparations consisting of or containing urea ascorbate (by which term I include both the laevo and dextro forms of the ascorbate radical, but particularly the laevo form), and various complex preparations in the form of salts or addition products or molecular association, and in some cases perhaps only mixtures, of urea ascorbate and its metal salts with various substances which are themselves therapeutic agents or form therapeutic agents with urea ascorbate and its metal salts. The substances which, according to the invention, form therapeutic combinations with urea ascorbate and its salts include the various anti-biotics, like the sulfonamides, and particularly sulfanilamide, sulfathiazole, sulfapyridine, sulfapyrimidines, sulfathiodiazole, and the metal sulfonamides, like sodium sulfanilamide, calcium sulfathiazole, etc.; penicillin and its sodium, potassium, ammonium, calcium and other metal salts and its acetic, benzoic and other esters; and tyrothricin and biotin; and likewise hexamethylenetetramine (methenamine); mandelic acid and mandelamide; alkaloids, such as procaine, quinine, atabrine, theobromine and theophylline; amino acids such as those obtainable on hydrolysis of proteins like histidine, arginine, lysine, glycocoll and methionine; thyroid extracts including thyroxin and thyroglobulin; pyrimidines such as ethyl thiouracil, thiocytidil; thioazolines, like dithioazoline; and the purines, such as adenylic and guanylic acids, adenine and guanine.

It is the general object of the invention to provide therapeutic agents having one or more of the advantages of improved stability, greater solubility, reduced toxicity, greater tolerability, and generally improved therapeutic activity either alone or in association with other therapeutic agents. More specific objects of the invention will appear from the following detailed description of the invention.

In a number of my earlier applications and issued patents, I have disclosed that both laevo and dextro ascorbic acids and their respective radicals act as superior vehicles or agencies for introducing various therapeutic metals and compounds into the human organism. In these compounds the laevo ascorbic acid not only contributes a vitamin C activity (which in much milder form is likewise possessed by the dextroascorbic acid), which activity is generally highly desirable and in many cases serves to correct a deficiency which accompanies the major ailment being treated, but also acts to aid in combining the therapeutic agent, such as a therapeutic metal, like calcium, bismuth, manganese, iron, and the like, with blood serum proteins, and thus improves the absorption and utilization of the major therapeutic constituent of the medicinal.

I have now found that ascorbic acid, and particularly l-ascorbic acid, combines with urea to form a compound having a higher degree of solubility than urea itself and a higher degree of stability than is possessed by l-ascorbic acid, so that each component of the salt contributes to the product a property which it possesses in a higher degree than the other. (In the subsequent description and in the claims I shall employ the term "ascorbate" to designate both the laevo and dextro forms, although in general the laevo form is the preferred compound.) This increased solubility and stability are, I have found, characteristic also of the various metal salts of urea ascorbate, including the sodium, potassium, lithium, calcium, magnesium, iron, copper, cobalt, bismuth, arsenic, antimony, and other metal compounds. I have found further that urea ascorbate and its metal salts can be combined or compounded or mixed in various ways with a large variety of therapeutic organic substances and particularly those containing an amino or substituted amino group, and that in such combination the urea ascorbate not only exerts its only therapeutic activity, but favorably affects the properties of the other constituent. Thus, in combination with sulfonamides, the urea ascorbate group reduces the well-known toxicity of such compounds, while in the case of penicillin and tyrothricin the stability is very considerably increased. With hexamethylenetetramine, mandelic acid, mandelamine, theobromine, and theophylline, the diuretic action is augmented, and with arginine a similarly improved diuretic effect is obtained. With quinine, atabrine and other alkaloids, an increased solubility combined with a lowered toxicity is obtained together with a mildly anaesthetic action, so that for example quinine and atabrine urea ascorbates are rendered useful in various additional ways, as in suppositories. The amino acids are generally stabilized by combination with urea ascorbate and its metal salts. In the case of the histidine compound there is also a marked increase in solubility. Lysine urea ascorbate, on the other hand, potentiates the estrogens and the androgens. The various pyrimidines and purines are better absorbed and with reduced reaction on injection in the form of a compound with a urea ascorbate or its metal salt. In short, in all of these combinations, the urea ascorbate represents a substantially non-toxic agency for improving the availability, tolerability and/or efficiency of various therapeutic substances.

I have found that urea ascorbate itself is an effective agent in the treatment of disturbances of water metabolism and vascular imbalance, clinically manifested by migraine which is relieved by increased diuresis. The urea ascorbate has a pronounced action in the relief of such condition, the ascorbic acid component acting synergistically with the urea in increasing the diuresis, so that smaller dosages of urea ascorbate than of urea alone are adequate for treatment. This is highly desirable as it is preferable to administer smaller quantities of nitrogenous substances which are active on the kidneys. The use of urea ascorbate thus makes it possible to increase diuresis without increasing the blood urea too greatly.

In wound healing, urea ascorbate has a greater stimulating action on the growth of fibroblasts than either urea or ascorbic acid alone. The compound has also a detoxicating action on partially decomposed tissues, as in gangrenous conditions, and tends to diminish the foul odor of infected wounds because of the redox action of ascorbic, especially laevo-ascorbic, acid. Also, where sulfonamides are employed in the wound, the simultaneous application of urea ascorbate tends to diminish the inhibiting action of pus on the sulfonamide drug.

Histidine urea ascorbate, which is one of the urea ascorbate compounds of amino acids, is even more anti-histamine in its properties than histidine itself, and so is indicated in the treatment of migraine headaches caused by histamine. The compound can be prepared in simple fashion by reacting equimolecular amounts of the amino acid with urea ascorbate, the same mode of preparation being applicable also to the urea ascorbate compounds of other amino acids.

The known therapeutic action of other medicinals capable of combining either in the form of salts or addition compounds or other molecular associations is considerably enhanced by combination with urea ascorbate.

The formation of the compounds according to the present invention can follow the usual procedure for the production of amine salts and addition compounds. Where the reaction takes place in aqueous solution and the product is soluble in water, the reaction mixture may be packaged in ampules, if desired, after sterilization. Soluble substances can be obtained in the solid condition either by evaporation or by the addition of an organic solvent which is miscible with the reaction medium but is a non-solvent for the product itself. Other known modes of separation can likewise be employed.

The following examples show by way of illustration several representative methods for the preparation of the products of the present invention:

EXAMPLE 1

Urea ascorbate 17.6 g. (0.1 mol) l-ascorbic acid and 6 g. (0.1 mol) urea were dissolved in 80 cc. of hot methyl alcohol. The reaction mixture was concentrated on the water bath to a heavy syrup and then treated with 100 cc. chloroform. On stirring an amorphous precipitate was obtained which became crystalline on standing. It was filtered by suction and washed with chloroform. Yield 23 g. or 100%. Titration with 0.1 N iodine solution showed that the addition product contained equimolecular proportions of urea and ascorbic radicals.

The probable formula is as follows:

EXAMPLE 2

Thiourea ascorbate 7.6 g. of thiourea and 17.6 g. ascorbic acid were dissolved in 300 cc. hot methyl alcohol. The solution was brought down to a thick paste in vacuo and 500 cc. ether were added. On standing in the ice chest, crystals of thiourea ascorbate precipitated. Yield 97%.

EXAMPLE 3

Sulfathiazole urea ascorbate 4.5 g. sulfathiazole (0.02 mol), 1.2 g. (0.02 mol) urea, and 3.5 g (0.02 mol) l-ascorbic acid were warmed together on the water bath in 80 cc. methyl alcohol until solution took place. A bright yellow color developed in the reaction mixture as soon as solution was complete. The solution was then concentrated on the water bath until crystallization just took place, which was at approximately 10 cc. The heavy syrup thus obtained was treated with 50 cc. chloroform. A semisolid precipitate was obtained which became crystalline on standing in the ice chest. Yield 8.5 g. or 92%. The product is very soluble in methyl alcohol but easily hydrolysed in the presence of water. Titration with 0.1 N iodine showed the formation of an addition product consisting of equimolecular amounts of sulfathiazole, urea and ascorbic acid. The probable formula is as follows:

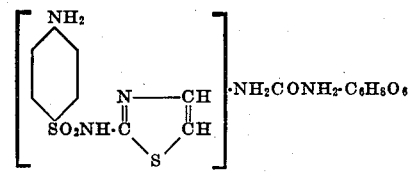

EXAMPLE 4

Sulfanilamide urea ascorbate 3.44 g. (0.02 mol) sulfanilamide, 1.2 g. (0.02 mol) urea, and 3.5 g (0.02 mol) l-ascorbic acid were dissolved in approximately 20 cc. boiling methyl alcohol, and concentrated on the water bath to a heavy syrup. The reaction mixture was then treated with 50 cc. chloroform. A bright yellow semisolid precipitate was obtained which crystallized on standing in the ice chest. Yield 8 g. or 100%. The product is very soluble in methyl alcohol, and insoluble in chloroform, benzol, ether and acetone. It is hydrolysed in the presence of water. Titration with 0.1 N iodine showed the formation of an addition product of equimolecular proportions.

The probable formula is as follows:

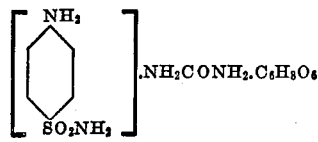

EXAMPLE 5

Arginine urea ascorbate 17.6 g. of ascorbic acid and 6 g. urea were dissolved in 100 cc. of water to which were added 17.4 g. of arginine. The solution was heated to 80° C. for twenty minutes with active stirring. It was then concentrated in vacuo to a thick syrup. 500 cc. of methyl alcohol were then added and the mixture placed in the ice chest over night. A yellowish white crystalline precipitate was formed. Addition of 300 cc. methyl alcohol brought down a second crop. The total yield was 84% of theoretical.

EXAMPLE 6

Theopyhlline urea ascorbate 17.6 g. l-ascorbic acid and 6 g. urea were dissolved in 1000 cc. hot methyl alcohol. To this were then added 9 g. of theophylline. The solution was stirred until the theophylline went completely into solution. It was then concentrated under vacuo to a thick syrup and 1000 cc. of ether added. On standing in the ice chest a heavy crystalline precipitate was obtained. The crystals were freely soluble in water. The yield was 96% of theoretical.

EXAMPLE 7

Penicillin urea ascorbate 1 g. of sodium penicillin was dissolved in 100 cc. of absolute methyl alcohol at a temperature of 80°. To this solution were added 17.6 g. l-ascorbic acid and 6 g. urea. The solution was evaporated under vacuo to a thick syrup and 300 cc. absolute ethyl alcohol were added. On standing in the ice chest a golden yellow caramel-like precipitate formed. This precipitate was then ground up in 100 g. of anhydrous lanolin. This ointment is effective in the treatment of slow healing wounds, particularly those around the ankles in elderly people.

EXAMPLE 8

Procaine urea ascorbate

To 17.6 g. l-ascorbic acid there were added 6 g. of urea dissolved in 100 cc. hot methyl alcohol. To this there were added 23.6 g. of procaine. The solution was stirred for ten minutes and then evaporated to a thick syrup in vacuo. 1000 cc. of ether were then added. On standing over night a heavy crystalline precipitate formed which was freely soluble in water. Yield 92%.

The alypin compound may be prepared in a manner analagous to the procaine urea ascorbate.

Tyrothricin urea ascorbate may be prepared precisely like the penicillin urea ascorbate described in Example 7.

EXAMPLE 9

Methenamine urea ascorbate 17.6 g. l-ascorbic acid and 6 g. urea were dissolved in 100 cc. hot methyl alcohol, the mixture being stirred until complete solution took place. To this was then added 14 g. methenamine and the solution stirred for 20 minutes.

The reaction mixture was then evaporated down to 30 cc. and 500 cc. of ether were added. The whole was placed in the ice chest over night. A heavy yellow crystalline precipitate was formed. The yield is almost theoretical.

EXAMPLE 10

Tyrothricin urea ascorbate 1 g. of tyrothricin was dissolved in 1 liter of propylene glycol. To this was added 17.6 g. of ascorbic acid and 6 g. of urea. Under gentle warming the reagents all went into solution with the formation of tyrothricin urea ascorbate. To this solution was now added 5 grams chlorbutanol. This solution is effective in the treatment of acute and chronic middle ear disease.

EXAMPLE 11

Thiouracil urea ascorbate 19.2 g. of thiouracil were suspended in 500 cc. of hot methyl alcohol. To this were now added 17.6 g. ascorbic acid and 6 grams urea. Under gentle heating the thiouracil went into solution. The solution was concentrated to a thick syrup and 500 cc. chloroform were added. On standing over night, a heavy precipitate of thiouracil urea ascorbate came down. Yield 100%.

EXAMPLE 12

Quinine urea ascorbate 37.8 g. of quinine alkaloid were dissolved in 300 cc. hot methyl alcohol. To this were then added 17.6 g. ascorbic acid and 6 g. urea. The solution was evaporated in vacuo until a heavy precipitate formed. The yellow crystals are freely soluble in water. The yield is theoretical.

Instead of reacting urea and ascorbic acid with the substance whose urea ascorbate compound is to be formed, such substance may be reacted with a previously formed urea ascorbate and the same applies to thiourea ascorbate and their metal salts.

Tests on the various substances prepared by me indicate that the compounds are true salts or addition products and not merely mixtures (although the formation of mixtures is not excluded, in certain cases). This is probably due to the fact that urea is an acid amide and so can form salts with mineral and organic acids as well as with metals.

As already indicated, urea ascorbate itself and its combinations with various medicinal agents, and particularly those containing an amino or acid group, may generally be employed for the same purposes for which urea itself has heretofore been used or for those for which the metal or compound combined or associated with the urea ascorbate has been employed, the ascorbate radical in all such cases exerting a detoxicating action and the urea contributing an antiseptic and cell growth stimulating effect, these two components having the above-described mutual effects on each other and acting also to supplement or potentiate the therapeutic action of the compounds with which they are combined or associated. The urea ascorbate and its various compounds can be employed not only as therapeutic agents administered by mouth or parenterally, but they can also be incorporated in various creamy or fatty vehicles for use as ointments or cosmetics. This is the case particularly with the sulfonamides, like sulfanilamide, sulfathiazole and sulfamerazine.

In some instances, instead of urea I may use thiourea, or guanidine, thus forming thiourea or guanidine ascorbate and compounds thereof. The thiourea compounds are particularly desirable where it is necessary to lower the metabolism, as in hyperthyrodism. Here thiourea ascorbate provides a safe, relatively non-toxic agent for the treatment of thyrotoxicosis. Thus thiouracil thiourea ascorbate can be administered in much smaller dosages than either thiouracil alone or thiourea ascorbate alone, while the sulfa guanidine ascorbate drugs may in general replace the corresponding urea drugs. Thus sulfanilamide guanidine ascorbate may be used in place of, or together with, sulfanilamide urea ascorbate, for example in ointments, or for insufflation of wounds, etc., and the same applies to the other sulfa drugs above named.

Another mode of procedure is to form the ascorbate of the therapeutic material and then react the same with urea, thiourea or guanidine. The procedures above described, are, however preferred.

I claim:

1. Urea ascorbate.
2. Process for the manufacture of urea ascorbate, which comprises mixing and heating substantially equimolecular proportions of ascorbic acid and urea in an alcohol, and then precipitating the product by the addition of chloroform.
3. Therapeutically active, isolated, crystalline urea ascorbate.

SIMON L. RUSKIN.

REFERENCES CITED

The following references are of record in the file of this patent:

UNITED STATES PATENTS

| Number | Name | Date |
| --- | --- | --- |
| 2,056,779 | Fosbinder | Oct. 6, 1936 |
| 2,075,390 | Forster | Mar. 30, 1937 |
| 2,132,662 | Volwiler and Moore | Oct. 11, 1938 |
| 2,134,246 | Elger | Oct. 25, 1938 |
| 2,140,989 | Eisenbrand and Sienz | Dec. 20, 1938 |
| 2,159,214 | Klein | May 23, 1939 |
| 2,212,831 | Hoffmann et al. | Aug. 27, 1940 |
| 2,297,212 | Gockel | Sept. 29, 1942 |

OTHER REFERENCES

Mathews, Physical Chem., 6th edition, pages 1150–1151, 1939, Williams & Wilkins Co., Baltimore.

Mathews, "Physiological Chemistry," 6th edition, 1939, pages 1154, 1155, 1161 and 1399, Williams & Wilkins Co., Baltimore.

"Nature," March 25, 1944, pages 384–385.

Kawerau et al., Scientific Proceedings of the Royal Dublin Soc., vol. 23, No. 17, August 1944, pages 171 to 175, 177.

Koppanyi, "Science," May 25, 1945, pages 541–542.